United States Patent
Schoenthal et al.

(10) Patent No.: US 6,496,942 B1
(45) Date of Patent: *Dec. 17, 2002

(54) COORDINATING PERSISTENT STATUS INFORMATION WITH MULTIPLE FILE SERVERS

(75) Inventors: Scott Schoenthal, San Ramon; Alan Rowe, San Jose; Steven R. Kleiman, Los Altos, all of CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/657,388

(22) Filed: Sep. 8, 2000

Related U.S. Application Data

(63) Continuation of application No. 09/139,257, filed on Aug. 25, 1998, now Pat. No. 6,119,244.

(51) Int. Cl.$^7$ ................................................. G06F 11/00
(52) U.S. Cl. ......................................................... 714/4
(58) Field of Search ........................ 714/4, 12; 709/216

(56) References Cited

U.S. PATENT DOCUMENTS

| | | |
|---|---|---|
| 4,456,957 A | 6/1984 | Schieltz |
| 4,710,868 A | 12/1987 | Cocke et al. |

(List continued on next page.)

FOREIGN PATENT DOCUMENTS

| | | |
|---|---|---|
| EP | 0 306 244 | 3/1989 |
| EP | 0 308 056 | 3/1989 |
| EP | 0 321 723 | 6/1989 |
| EP | 0 410 630 | 1/1991 |
| EP | 0 492 808 | 7/1992 |
| EP | 0537098 | 4/1993 |
| EP | 0 569 313 | 11/1993 |
| EP | 0 747 829 | 12/1996 |
| EP | 0 760 503 | 3/1997 |
| EP | 1 031 928 | 11/2000 |
| JP | 5-197495 | 8/1993 |
| JP | 7-261947 | 10/1995 |

(List continued on next page.)

OTHER PUBLICATIONS

Steven Kleiman, "Using Numa Interconnects for Highly Available Filers", 1999 IEEE. XP–002164052.
Timothy. Slashdot. Tux2: "The Filesystem That Would Be King". Microsoft Internet Explorer. Oct. 20, 2000.

*Primary Examiner*—Robert Beausoliel
*Assistant Examiner*—Bryce P. Bonzo
(74) *Attorney, Agent, or Firm*—Swernofsky Law Group PC

(57) ABSTRACT

The invention provides a storage system, and a method for operating a storage system, that provides for relatively rapid and reliable takeover among a plurality of independent file servers. Each file server maintains a reliable communication path to the others. Each file server maintains its own state in reliable memory. Each file server regularly confirms the state of the other file servers. Each file server labels messages on the redundant communication paths, so as to allow other file servers to combine the redundant communication paths into a single ordered stream of messages. Each file server maintains its own state in its persistent memory and compares that state with the ordered stream of messages, so as to determine whether other file servers have progressed beyond the file server's own last known state. Each file server uses the shared resources (such as magnetic disks) themselves as part of the redundant communication paths, so as to prevent mutual attempts at takeover of resources when each file server believes the other to have failed. Each file server provides a status report to the others when recovering from an error, so as to prevent the possibility of multiple file servers each repeatedly failing and attempting to seize the resources of the others.

12 Claims, 2 Drawing Sheets

U.S. PATENT DOCUMENTS

| | | |
|---|---|---|
| 4,719,569 A | 1/1988 | Ludemann et al. |
| 4,937,763 A | 6/1990 | Mott .......................... 364/550 |
| 5,049,873 A | 9/1991 | Robins et al. |
| 5,067,099 A | 11/1991 | McCown et al. ........... 364/550 |
| 5,088,081 A | 2/1992 | Farr |
| 5,155,835 A | 10/1992 | Row et al. |
| 5,257,391 A | 10/1993 | DuLac et al. |
| 5,274,799 A | 12/1993 | Brant et al. |
| 5,278,838 A | 1/1994 | Ng et al. |
| 5,305,326 A | 4/1994 | Solomon et al. |
| 5,341,381 A | 8/1994 | Fuller |
| 5,355,453 A | 10/1994 | Row et al. |
| 5,357,509 A | 10/1994 | Ohizumi |
| 5,357,612 A | 10/1994 | Alaiwan |
| 5,379,417 A | 1/1995 | Lui et al. |
| 5,390,187 A | 2/1995 | Stallmo |
| 5,398,253 A | 3/1995 | Gordon |
| 5,452,444 A | 9/1995 | Solomon et al. |
| 5,454,095 A | 9/1995 | Kraemer et al. |
| 5,497,422 A | 3/1996 | Tysen et al. |
| 5,504,883 A | 4/1996 | Covertson et al. |
| 5,537,567 A | 7/1996 | Hitz et al. |
| 5,572,711 A | 11/1996 | Hirsch et al. |
| 5,604,862 A | 2/1997 | Midgely et al. |
| 5,621,663 A | 4/1997 | Skagerling |
| 5,668,943 A | 9/1997 | Attanasio et al. |
| 5,675,726 A | 10/1997 | Hohenstein et al. |
| 5,678,006 A | 10/1997 | Valizadeh et al. |
| 5,721,916 A | 2/1998 | Pardikar |
| 5,729,685 A | 3/1998 | Chatwani et al. |
| 5,781,716 A | 7/1998 | Hemphill et al. |
| 5,819,292 A | 10/1998 | Hitz et al. |
| 5,819,310 A | 10/1998 | Vishlitzky |
| 5,841,997 A | 11/1998 | Bleiweiss et al. |
| 5,856,981 A | 1/1999 | Voelker |
| 5,862,312 A | 1/1999 | Mann et al. |
| 5,950,203 A | 9/1999 | Stakuis et al. |
| 5,996,086 A | 11/1999 | Delaney |
| 6,199,099 B1 | 3/2000 | Gershmann et al. |
| 6,098,155 A | 8/2000 | Chong Jr. |
| 6,101,507 A | 8/2000 | Cane et al. |
| ,001,860 A | 9/2000 | Asthana et al. |
| 6,119,244 A * | 9/2000 | Schoenthal ..................... 714/4 |
| 6,134,673 A * | 10/2000 | Chrabaszcz .................. 714/13 |
| 6,138,126 A | 10/2000 | Hitz et al. |
| 6,163,853 A * | 12/2000 | Findlay ........................ 714/4 |
| 6,275,953 B1 | 8/2001 | Vahalia et al. |
| 6,279,011 B1 | 8/2001 | Mulhestein |
| 6,289,356 B1 | 9/2001 | Hitz et al. |
| 6,317,844 B1 | 11/2001 | Kleiman |
| 2001/0039622 A1 | 11/2001 | Hitz et al. |
| 2001/0044807 A1 | 11/2001 | Kleiman et al. |
| 2002/0007470 A1 | 1/2002 | Kleiman |
| 2002/0049718 A1 | 4/2002 | Kleiman et al. |

FOREIGN PATENT DOCUMENTS

| | | |
|---|---|---|
| WO | WO 94/29795 | 12/1994 |
| WO | WO 94/29796 | 12/1994 |
| WO | WO 98/38576 | 9/1998 |
| WO | WO 99/46680 | 9/1999 |
| WO | WO 00/07104 | 2/2000 |
| WO | WO 00/11553 | 3/2000 |
| WO | WO 01/14991 | 3/2001 |
| WO | WO 01/31446 | 5/2001 |
| WO | WO 01/43368 | 6/2001 |
| WO | WO 02/29572 | 4/2002 |

* cited by examiner

COORDINATING PERSISTENT STATUS INFORMATION WITH MULTIPLE FILE SERVERS

This is a continuation of application Ser. No. 09/139,257, filed Aug. 25, 1998 now U.S. Pat. No. 6,119,244, now allowed.

BACKGROUND OF THE INVENTION

1. Field of the Invention

The invention relates to computer systems.

2. Related Art

Computer storage systems are used to record and retrieve data. It is desirable for the services and data provided by the storage system to be available for service to the greatest degree possible. Accordingly, some computer storage systems provide a plurality of file servers, with the property that when a first file server fails, a second file server is available to provide the services, and the data otherwise provided by the first. The second file server provides these services and data by takeover of resources otherwise managed by the first file server.

One problem in the known art is that when two file servers each provide backup for the other, it is important that each of the two file servers is able to reliably detect failure of the other and to smoothly handle any required takeover operations. It would be advantageous for this to occur without either of the two file servers interfering with proper operation of the other. This problem is particularly acute in systems when one or both file servers recover from a service interruption.

Accordingly, it would be advantageous to provide a storage system and a method for operating a storage system, that provides for relatively rapid and reliable takeover among a plurality of independent file servers. This advantage is achieved in an embodiment of the invention in which each file server (a) maintains redundant communication paths to the others, (b) maintains its own state in persistent memory at least some of which is accessible to the others, and (c) regularly confirms the state of the other file servers.

SUMMARY OF THE INVENTION

The invention provides a storage system and a method for operating a storage system, that provides for relatively rapid and reliable takeover among a plurality of independent file servers. Each file server maintains a reliable (such as redundant) communication path to the others, preventing any single point of failure in communication among file servers. Each file server maintains its own state in reliable (such as persistent) memory at least some of which is accessible to the others, providing a method for confirming that its own state information is up to date, and for reconstructing proper state information if not. Each file server regularly confirms the state of the other file servers, and attempts takeover operations only when the other file servers are clearly unable to provide their share of services.

In a preferred embodiment, each file server sequences messages on the redundant communication paths, so as to allow other file servers to combine the redundant communication paths into a single ordered stream of messages. Each file server maintains its own state in its persistent memory and compares that state with the ordered stream of messages, so as to determine whether other file servers have progressed beyond the file server's own last known state. Each file server uses the shared resources (such as magnetic disks) themselves as part of the redundant communication paths, so as to prevent mutual attempts at takeover of resources when each file server believes the other to have failed.

In a preferred embodiment, each file server provides a status report to the others when recovering from an error, so as to prevent the possibility of multiple file servers each repeatedly failing and attempting to seize the resources of the others.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors (or special purpose processors adapted to the particular process steps and data structures) operating under program control, and that implementation of the preferred process steps and data structures described herein using such equipment would not require undue experimentation or further invention.

In a preferred embodiment. the file server system, and each file server therein, operates using inventions described in the following patent applications:

Application Ser. No. 09/037,652, filed Mar. 10, 1998, in the name of inventor Steven Kleiman, titled "Highly Available File Servers."

Each of these applications is hereby incorporated by reference as if fully set forth herein. They are collectively referred to as the "Clustering Disclosures."

In a preferred embodiment, each file server in the file server system controls its associated mass storage devices so as to form a redundant array, such as a RAID storage system, using inventions described in the following patent applications:

Application Ser. No. 08/471,218, filed Jun. 5, 1995, in the name of inventors David Hitz et al., titled "A Method for Providing Parity in a Raid Sub-System Using Non-Volatile Memory";

Application Ser. No. 08/454,921, filed May 31, 1995, in the name of inventors David Hitz et al., titled "Write Anywhere File-System Layout";

Application Ser. No. 08/464,591, filed May 31, 1995, in the name of inventors David Hitz et al., titled "Method for Allocating Files in a File System Integrated with a Raid Disk Sub-System".

Each of these applications is hereby incorporated by reference as if fully set forth herein. They are collectively referred to as the "WAFL Disclosures."

System Elements

Figure 1:
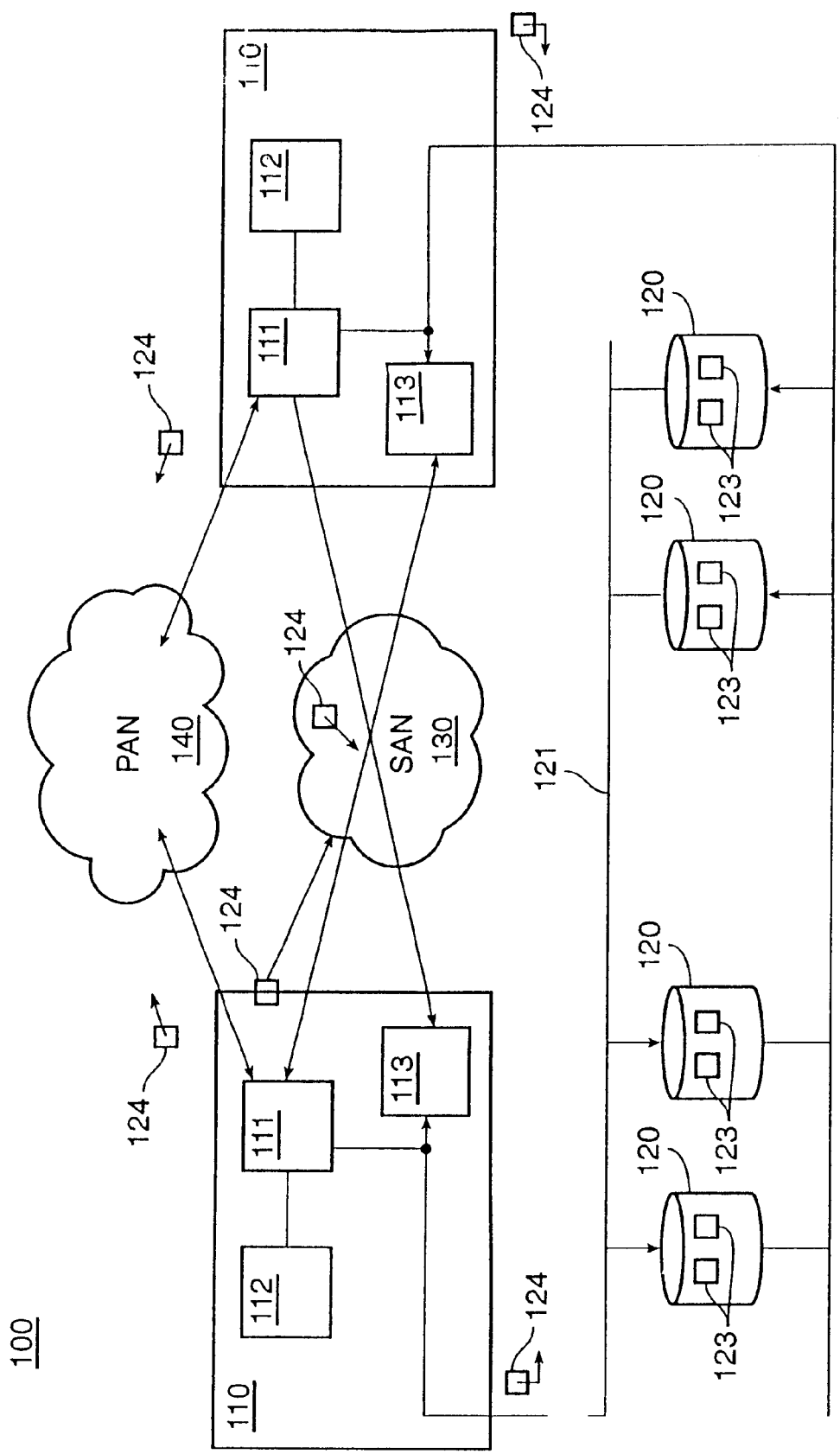
FIG. 1 shows a block diagram of a multiple file server system with coordinated persistent status information.

FIG. 1 shows a block diagram of a multiple file server system with coordinated persistent status information.

A system 100 includes a plurality of file servers 110, a plurality of mass storage devices 120, a SAN (system area network) 130, and a PN (public network) 140.

In a preferred embodiment, there are exactly two file servers 110. Each file server 110 is capable of acting independently with regard to the mass storage devices 120. Each file server 110 is disposed for receiving file server requests from client devices (not shown), for performing operations on the mass storage devices 120 in response thereto, and for transmitting responses to the file server requests to the client devices.

For example, in a preferred embodiment, the file servers 110 are each similar to file servers described in the Clustering Disclosures.

Each of the file servers 110 includes a processor 111, program and data memory 112, and a persistent memory 113 for maintaining state information across possible service interruptions. In a preferred embodiment, the persistent memory 113 includes a nonvolatile RAM.

The mass storage devices 120 preferably include a plurality of writeable magnetic disks, magneto-optical disks, or optical disks. In a preferred embodiment, the mass storage devices 120 are disposed in a RAID configuration or other system for maintaining information persistent across possible service interruptions.

Each of the mass storage devices 120 are coupled to each of the file servers 110 using a mass storage bus 121. In a preferred embodiment, each file server 110 has its own mass storage bus 121. The first file server 110 is coupled to the mass storage devices 120 so as to be a primary controller for a first subset of the mass storage devices 120 and a secondary controller for a second subset thereof. The second file server 110 is coupled to the mass-storage devices 120 so as to be a primary controller for the second subset of the mass storage devices 120 and a secondary controller for the first subset thereof.

The mass storage bus 121 associated with each file server 110 is coupled to the processor 111 for that file server 110 so that file server 110 can control mass storage devices 120. In alternative embodiments, the file servers 110 may be coupled to the mass storage devices 120 using other techniques, such as fiber channel switches or switched fabrics.

The mass storage devices 120 are disposed to include a plurality of mailbox disks 122, each of which has at least one designated region 123 into which one file server 110 can write messages 124 for reading by the other file server 110. In a preferred embodiment, there is at least one designated region 123, on each mailbox disk 122 for reading and at least one designated region 123 for writing, by each file server 110.

The SAN 130 is coupled to the processor 111 and to the persistent memory 113 at each of the file servers 110. The SAN 130 is disposed to transmit messages 124 from the processor 111 at the first file server 110 to the persistent memory 113 at the second file server 110. Similarly, the SAN 130 is disposed to transmit messages 124 from the processor 111 at the second file server 110 to the persistent memory 113 at the first file server 110.

In a preferred embodiment, the SAN 130 comprises a ServerNet connection between the two file servers 110. In alternative embodiments, the persistent memory 112 may be disposed logically remote to the file servers 110 and accessible using the SAN 130.

The PN 140 is coupled to the processor 111 at each of the file servers 110. The PN 140 is disposed to transmit messages 124 from each file server 110 to the other file server 110.

In a preferred embodiment, the PN 140 can comprise a direct communication channel, a LAN (local area network), a WAN (wide area network), or some combination thereof.

Although the mass storage devices 120, the SAN 130, and the PN 140 are each disposed to transmit messages 124, the messages 124 transmitted using each of these pathways between the file servers 110 can have substantially differing formats, even though payload for those messages 124 is identical.

Method of Operation

Figure 2:
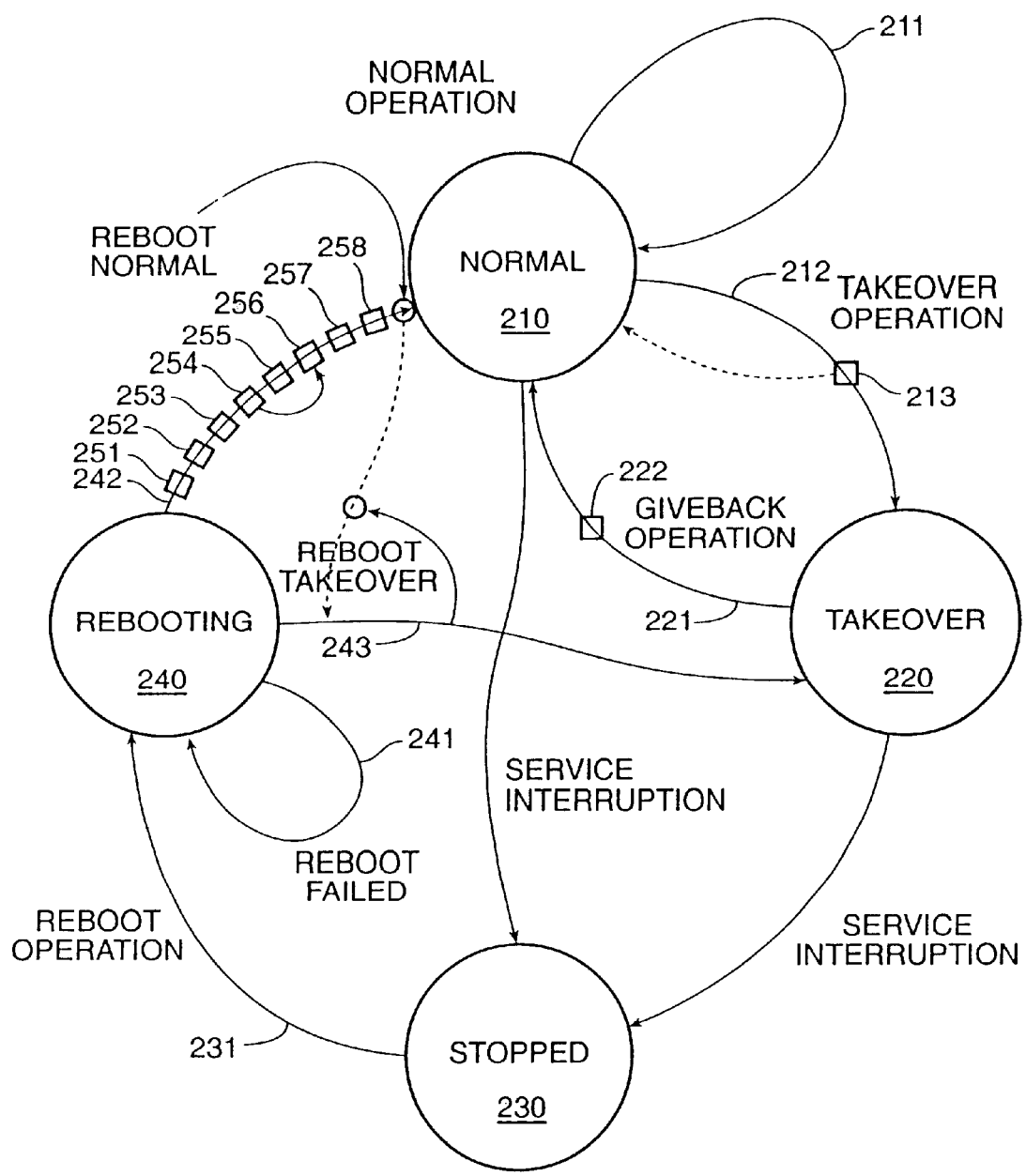
FIG. 2 shows a state diagram of a method of operation for a multiple file server system with coordinated persistent status information.

FIG. 2 shows a state diagram of a method of operation for a multiple file server system with coordinated persistent status information.

A state diagram 200 includes a plurality of states and a plurality of transitions therebetween. Each transition is from a first state to a second state and occurs upon detection of a selected event.

The state diagram 200 is followed by each of the file servers 110 independently. Thus, there is a state for "this" file server 110 and another (possibly same, possibly different) state for the "the other" file server 110. Each file server 110 independently determines what transition to follow from each state to its own next state. The state diagram 200 is described herein with regard to "this" file server 110.

In a NORMAL state 210, this file server 110 has control of its own assigned mass storage devices 120.

In a TAKEOVER state 220, this file server 110 has taken over control of the mass storage devices 120 normally assigned to the other file server 110.

In a STOPPED state 230, this file server 110 has control of none of the mass storage devices 120 and is not operational.

In a REBOOTING state 240, this file server 110 has control of none of the mass storage devices 120 and is recovering from a service interruption.

NORMAL State

In the NORMAL state 210, both file servers 110 are operating properly, and each controls its set of mass storage devices 120.

In this state, each file server 110 periodically sends state information in messages 124 using the redundant communication paths between the two file servers 110. Thus, each file server 110 periodically transmits messages 124 having state information by the following techniques:

Each file server 110 transmits a message 124 by copying that message to the mailbox disks on its assigned mass storage devices 120.

In a preferred embodiment, messages 124 are transmitted using the mailbox disks by writing the messages 124 to a first mailbox disk and then to a second mailbox disk.

Each file server 110 transmits a message 124 by copying that message 124, using the SAN 130, to its persistent memory 113 (possibly both its own persistent memory 113 and that for the other file server 110).

In a preferred embodiment, messages 124 are transmitted using the SAN 130 using a NUMA technique. and Each file server 110 transmits a message 124 by transmitting that message 124, using the PN 140, to the other file server 110.

In a preferred embodiment, messages 124 are transmitted using the PN 140 using encapsulation in a communication protocol known to both file servers 110, such as UDP or IP.

Each message 124 includes the following information for "this" file server 110 (that is, the file server 110 transmitting the message 124):

a system ID for this file server 110;

a state indicator for this file server 110;

In a preferred embodiment, the state indicator can be one of the following:

(NORMAL) operating normally, (TAKEOVER) this file server 110 has taken over control of the mass storage devices 120, (NO-TAKEOVER) this file server 110 does not want the receiving file server to take over control of its mass storage devices 120, and (DISABLE) takeover is disabled for both file servers 110.

a generation number Gi, comprising a monotonically increasing number identified with a current instantiation of this file server 110;

In a preferred embodiment, the instantiation of this file server 110 is incremented when this file server 110 is initiated on boot-up. If any file server 110 suffers a service interruption that involves reinitialization, the generation number Gi will be incremented, and the message 124 will indicate that it is subsequent to any message 124 send before the service interruption. and a sequence number Si, comprising a monotonically increasing number identified with the current message 124 transmitted by this file server 110.

Similarly, each message 124 includes the following information for "the other" file server 110 (that is, the file server 110 receiving the message 124):

a generation number Gi, comprising a monotonically increasing number identified with a current instantiation of the other file server 110; and a sequence number Si, comprising a monotonically increasing number identified with the most recent message 124 received from the other file server 110.

Each message 124 also includes a version number of the status protocol with which the message 124 is transmitted.

Since the file server 110 receives the messages 124 using a plurality of pathways, it determines for each message 124 whether or not that message 124 is "new" (the file server 110 has not seen it before), or "old" (the file server 110 has seen it before). The file server 110 maintains a record of the generation number Gi and the sequence number Si of the most recent new message 124. The file server 110 determines that the particular message 124 is new if and only if:

its generation number Gi is greater than the most recent new message 124; or its generation number Gi is equal to the most recent new message 124 and its sequence number Si is greater than most recent new message 124.

If either of the file servers 110 determines that the message 124 is not new, that file server 110 can ignore that message 124.

In this state, each file server 110 periodically saves its own state information using the messages 124. Thus, each file server 110 records its state information both on its own mailbox disks and in its own persistent memory 113.

In this state, each file server 110 periodically watches for a state change in the other file server 110. The first file server 110 detects a state change in the second file server 110 in one of at least two ways:

The first file server 110 notes that the second file server 110 has not updated its state information (using a message 124) for a timeout period.

In a preferred embodiment, this timeout period is two-half seconds for communication using the mailbox disks and one-half second for communication using the SAN 130. However, there is no particular requirement for using these timeout values; in alternative embodiments, different timeout values or techniques other than timeout periods may be used. and The first file server 110 notes that the second file server 110 has updated its state information (using one or more messages 124) to indicate that the second file server 110 has changed its state.

In a preferred embodiment, the second file server 110 indicates when it is in one of the states described with regard to each message 124.

If the first file server 110 determines that the second file server 110 is also in the NORMAL state, the NORMAL-OPERATION transition 211 is taken to remain in the state 210.

The first file server 110 makes its determination responsive to messages 124 it receives from the second file server 110. If there are no such messages 124 for a time period responsive to the timeout period described above (such as two to five times the timeout period), the first file server 110 decides that the second file server 110 has suffered a service interruption.

If the first file server 110 determines that the second file server 110 has suffered a service interruption (that is, the second file server 110 is in the STOPPED state 230), the TAKEOVER-OPERATION transition 212 is taken to enter the TAKEOVER state 220.

The TAKEOVER-OPERATION transition 212 can be disabled by a message 124 state indicator such as DISABLE or NO-TAKEOVER.

In a preferred embodiment, either file server 110 can disable the TAKEOVER-OPERATION transition 212 responsive to (a) an operator command, (b) a synchronization error between the persistent memories 113, or (c) any compatibility mismatch between the file servers 110.

To perform the TAKEOVER-OPERATION transition 212, this file server 110 performs the following actions at a step 213:

This file server 110 sends the message 124 state indicator TAKEOVER to the other file server 110, using including the reliable communication path (including the mailbox disks 122, the SAN 130, and the PN 140).

This file server 110 waits for the other file server 110 to have the opportunity to receive and act on the TAKEOVER-OPERATION transition 212 (that is, to suspend its own access to the mass storage devices 120.

This file server 110 issues disk reservation commands to the mass storage devices 120 normally assigned to the other file server 110.

This file server 110 takes any other appropriate action to assure that the other file server 110 is passive.

If the takeover operation is successful, the TAKEOVER-OPERATION transition 212 completes and this file server enters the TAKEOVER state 220. Otherwise (such as if takeover is disabled), this file server 110 returns to the NORMAL state 210.

TAKEOVER State

In the TAKEOVER state 220, this file server 110 is operating properly, but the other file server 110 is not. This file server 110 has taken over control of both its and the other's mass storage devices 120.

In this state, this file server 110 continues to write messages 124 to the persistent memory 113 and to the mailbox disks 122, so as to preserve its own state in the event of a service interruption.

In this state, this file server 110 continues to control all the mass storage devices 120, both its own and those normally assigned to the other file server 110, until this file server 110 determines that it should give back control of some mass storage devices 120.

In a preferred embodiment, the first file server 110 makes its determination responsive to operator control. An operator for this file server 110 determines that the other file server 110 has recovered from its service interruption. The GIVEBACK-OPERATION transition 221 is taken to enter the NORMAL state 210.

In alternative embodiments, the first file server 110 may make its determination responsive to messages 124 it receives from the second file server 110. If the second file server 110 sends messages 124 indicating that it has recovered from a service interruption (that is, it is in the REBOOTING state 240), the first file server 110 may initiate the GIVEBACK-OPERATION transition 221.

To perform the GIVEBACK-OPERATION transition 221, this file server 110 performs the following actions at a step 222:

This file server 110 releases its disk reservation commands to the mass storage devices 120 normally assigned to the other file server 110.

This file server 110 sends the message 124 state indicator NORMAL to the other file server 110, including using the mailbox disks 122, the SAN 130, and the PN 140.

This file server 110 disables the TAKEOVER-OPERATION transition 212 by the other file server 110 until the other file server 110 enters the NORMAL state 210. This file server 110 remains at the step 222 until the other file server 110 enters the NORMAL state 210.

When the giveback operation is successful, the GIVEBACK-OPERATION transition 221 completes and this file server enters the NORMAL state 210.

STOPPED State

In the STOPPED state 230, this file server 110 has control of none of the mass storage devices 120 and is not operational.

In this state, this file server 10 performs no operations, until this file server 110 determines that it reboot.

In a preferred embodiment, the first file server 110 makes its determination responsive to operator control. An operator for this file server 110 determines that it has recovered from its service interruption. The REBOOT-OPERATION transition 231 is taken to enter the REBOOTING state 240.

In alternative embodiments, the first file server 110 may make its determination responsive to a timer or other automatic attempt to reboot. When this file server 110 determines that it has recovered from its service interruption, it attempts to reboot, and the REBOOT-OPERATION transition 231 is taken to enter the REBOOTING state 240.

REBOOTING State

In the REBOOTING state 240, this file server 110 has control of none of the mass storage devices 120 and is recovering from a service interruption.

In this state, the file server 110 attempts to recover from a service interruption.

If this file server 110 is unable to recover from the service interruption, the REBOOT-FAILED transition 241 is taken and this file server 110 remains in the REBOOTING state 240.

If this file server 110 is able to recover from the service interruption, but the other file server 110 is in the TAKEOVER state 220, the REBOOT-FAILED transition 241 is taken and this file server 110 remains in the REBOOTING state 240. In this case, the other file server 110 controls the mass storage devices 120 normally assigned to this file server 110, and this file server 110 waits for the GIVEBACK-OPERATION transition 221 before re-attempting to recover from the service interruption.

If this file server 110 is able to recover from the service interruption, and determines it should enter the NORMAL state 210 (as described below), the REBOOT-NORMAL transition 242 is taken and this file server 110 enters the NORMAL state 210.

If this file server 110 is able to recover from the service interruption, and determines it should enter the TAKEOVER state 210 (as described below), the REBOOT-TAKEOVER transition 243 is taken and this file server 110 enters the TAKEOVER state 210.

In a preferred embodiment, this file server 110 performs the attempt to recover from the service interruption with the following steps.

At a step 251, this file server 110 initiates its recovery operation.

At a step 252, this file server 110 determines whether it is able to write to any of the mass storage devices 120 (that is, if the other file server 110 is in the TAKEOVER state 220). If so, this file server 110 displays a prompt to an operator so indicating and requesting the operator to command the other file server 110 to perform the GIVEBACK-OPERATION transition 221.

This file server 110 waits until the operator commands the other file server 110 to perform a giveback operation, waits until the GIVEBACK-OPERATION transition 221 is complete, and proceeds with the next step.

At a step 253, this file server 110 determines the state of the other file server 110. This file server 110 makes this determination in response to its own persistent memory 113 and the mailbox disks 122. This file server 110 notes the state it was in before entering the REBOOTING state 240 (that is, either the NORMAL state 210 or the TAKEOVER state 220).

If this file server 110 determines that the other file server 110 is in the NORMAL state 210, it proceeds with the step 254. If this file server 110 determines that it had previously taken over all the mass storage devices 120 (that is, that the other file server 110 is in the STOPPED state 230 or the REBOOTING state 240), it proceeds with the step 255.

At a step 254, this file server 110 attempts to seize its own mass storage devices 120 but not those normally assigned to the other file server 110. This file server 110 proceeds with the step 256.

At a step 255, this file server 110 attempts to seize both its own mass storage devices 120 and those normally assigned to the other file server 110. This file server 110 proceeds with the step 256.

At a step 256, this file server 110 determines whether its persistent memory 113 is current with regard to pending file server operations. If not, this file server 110 flushes its persistent memory 113 of pending file server operations.

At a step 257, this file server 110 determines if it is able to communicate with the other file server and if there is anything (such as an operator command) preventing takeover operations. This file server 110 makes its determination in response to the persistent memory 113 and the mailbox disks 122.

At a step 258, if this file server 110 was in the NORMAL state 210 before entering the REBOOTING state 240 (that is, this file server 110 performed the step 254 and seized only its own mass storage devices 120), it enters the NORMAL state 210.

At a step 258, if this file server 110 was in the TAKEOVER state 220 before entering the REBOOTING state 240 (that is, this file server 110 performed the step 255 and seized all the mass storage devices 120), it enters the TAKEOVER state 220.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A memory, including a set of instructions, wherein said set of instructions are executable by a processor to operate a file server, said set of instructions comprising:

controlling a subset of a set of shared storage devices;

receiving and transmitting messages with a second file server, said steps for receiving and transmitting using a communication path including said shared storage devices;

monitoring said communication path and said shared storage devices;

storing state information about said file server in a persistent memory; and performing a takeover operation of said shared storage device in response to said instructions for monitoring and a state of said persistent memory, wherein said instructions for receiving and transmitting prevent both of said first server and said second server from concurrently performing said takeover operation.

2. A memory, as in claim 1, including instructions for managing at a first server at least part of a shared resource;

receiving and transmitting a sequence of messages between said first server to a second server, using said shared resource; and performing a takeover operation at a first server of at least part of said shared resource in response to said sequence of messages;

whereby said instructions for receiving and transmitting prevent both of said first server and said second server from concurrently performing said takeover operation.

3. A memory as in claim 1, including instructions for determining, at said first server, a state for itself and for said second server in response to said communication path;

determining, at said second server, a state for itself and for said first server in response to said communication path;

whereby said first server and said second server concurrently each determine state for each other, such that it does not occur that each of said first server and said second server both consider the other to be inoperative.

4. A memory as in claim 1, also including an instruction for storing state information about said first server in a persistence memory, wherein said first server determines a state for itself in response to a state of said persistent memory.

5. A memory as in claim 1, including instructions for transmitting, from said first server, recovery information relating to a status of said first server on recovery from a service interruption; and performing a giveback operation of at least part of said shared resource is responsive to said recovery information.

6. A memory, as in claim 1, including instructions for transmitting, from said first server, recovery information relating to a status of said server on recovery from a service interruption;

wherein said instructions for performing said takeover operation are responsive to said recovery information.

7. A memory as in claim 1, wherein said shared storage device includes a plurality of storage devices; and said communication path includes at least part of said storage devices;

whereby loss of access to said part of said storage devices breaks said communication path.

8. A memory as in claim 1, including instructions for transmitting at least one message from a first said server to a second said server, said message indicating that said first server is attempting said takeover;

altering a state of said second server in response to said message; and in said altered state refraining from writing to said shared resource.

9. A memory as in claim 1, wherein said communication path includes a plurality of independent communication paths between said pair; and including instructions for numbering said sequence of messages;

determining, at each recipient, a unified order for messages delivered using different ones of said plurality of independent communication paths; and determining, at said first server, a state for itself and for said second server in response to a state of said shared resource and in response to a state of a persistent memory at said first server.

10. A memory as in claim 1, wherein said communication path includes a plurality of independent communication paths between said pair; and including instructions for numbering said sequence of messages;

determining, at each recipient, a unified order for messages delivered using different ones of said plurality of independent communication paths;

transmitting substantially each message in said sequence on at least two of said plurality of independent communication paths, whereby there is no single point of failure for communication between said pair.

11. A method as in claim 1, wherein said communication path includes a plurality of independent communication paths between said pair; and including instructions for numbering said sequence of messages;

determining, at each recipient, a unified order for messages delivered using different ones of said plurality of independent communication paths;

wherein said plurality of independent communication paths includes at least two of the group: a packet network, a shared element, a system area network.

12. A method as in claim 1, wherein said communication path includes a plurality of independent communication paths between said pair; and including steps for numbering said sequence of messages;

determining, at each recipient, a unified order for messages delivered using different ones of said plurality of independent commuication paths;

wherein said steps for numbering include (a) determining a generation number in response to a service interruption and persistent memory for a sender of said message, and (b) providing said generation number in substantialy each message in said sequence.

* * * * *